UNITED STATES PATENT OFFICE.

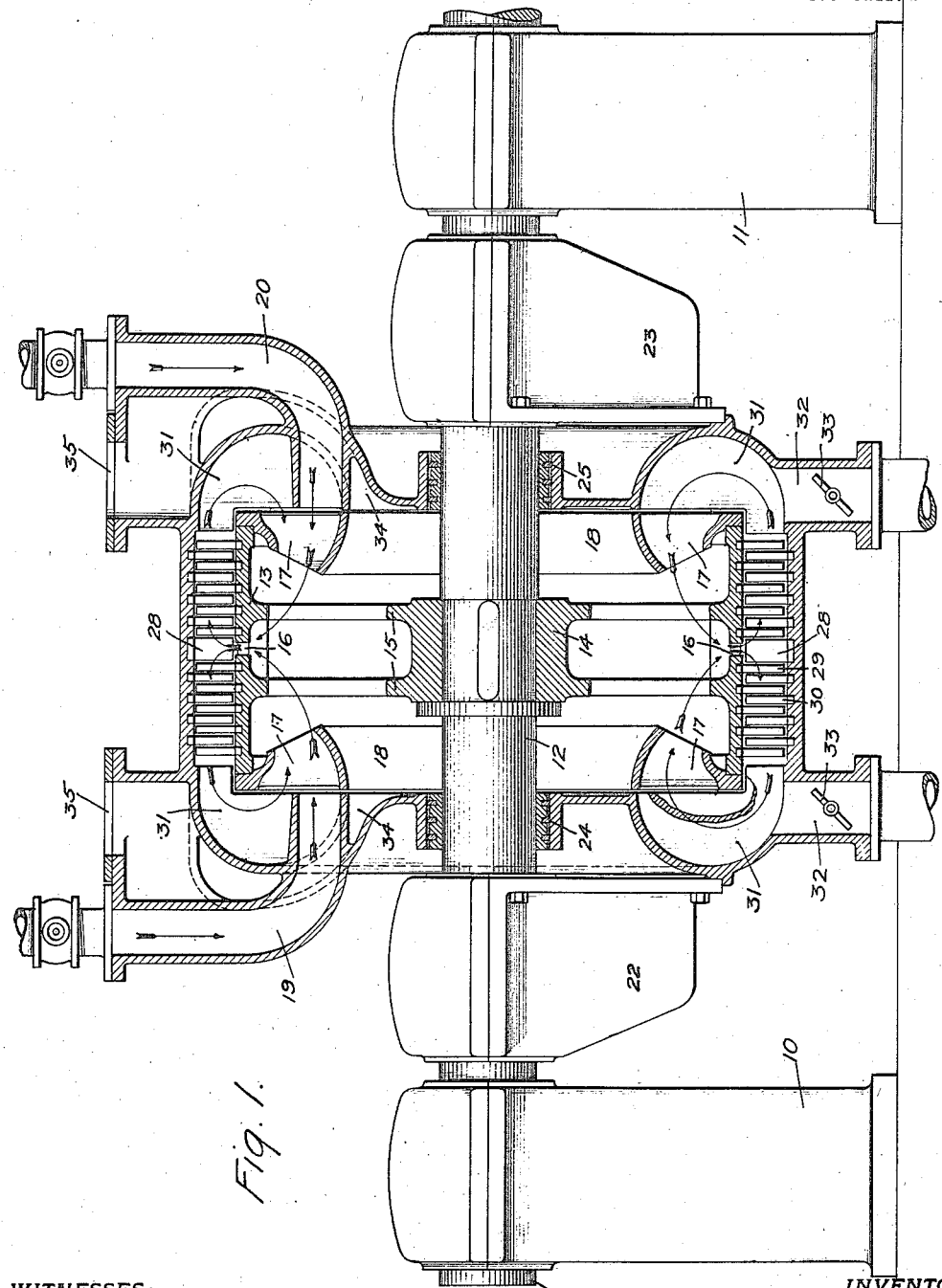

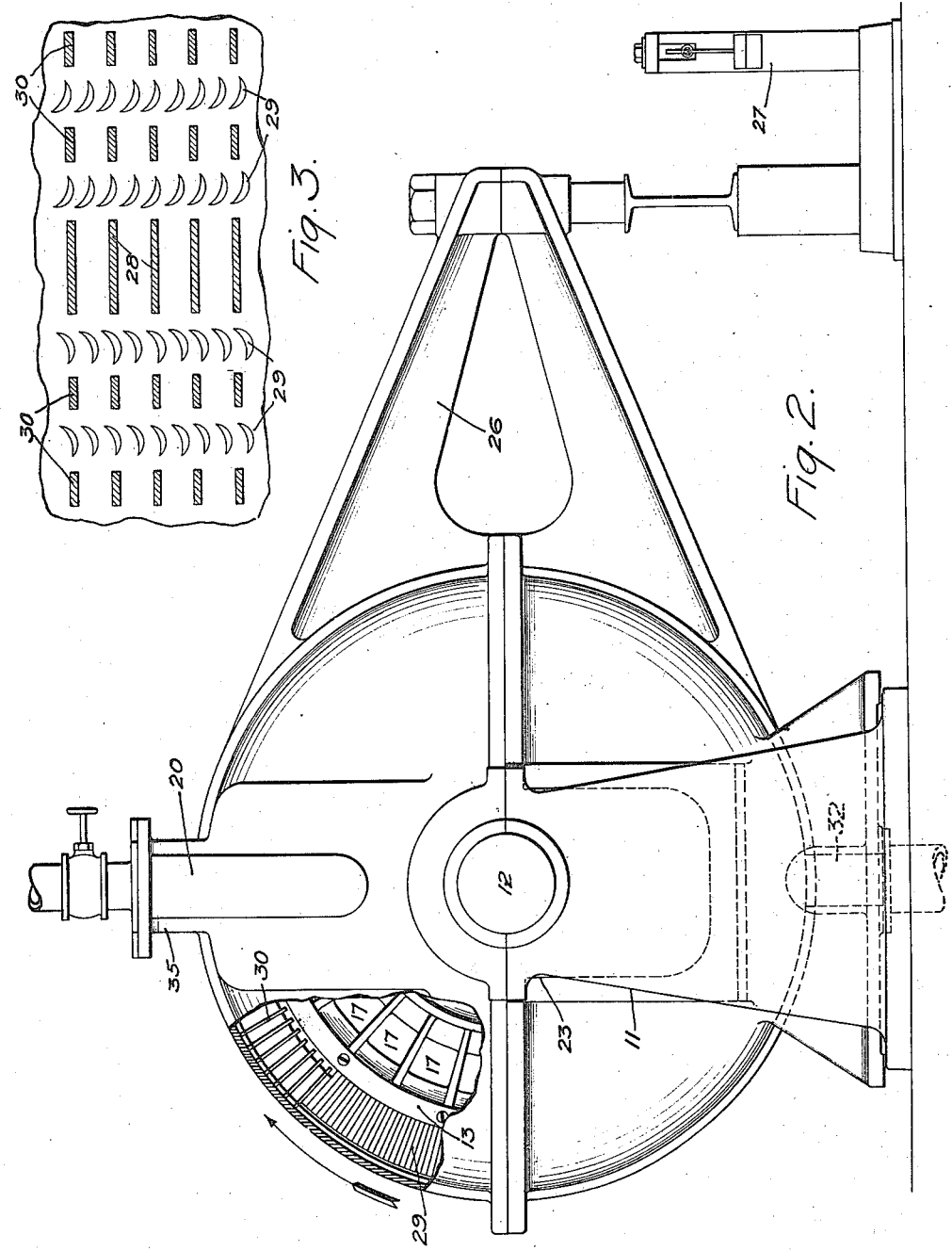

RAYMOND N. EHRHART, OF EDGEWOOD PARK, PENNSYLVANIA, ASSIGNOR, BY MESNE ASSIGNMENTS, TO THE COLONIAL TRUST COMPANY, TRUSTEE, OF PITTSBURGH, PENNSYLVANIA, A CORPORATION OF PENNSYLVANIA.

FLUID-BRAKE.

1,161,116.  Specification of Letters Patent.  Patented Nov. 23, 1915.

Application filed October 27, 1909. Serial No. 524,928.

*To all whom it may concern:*

Be it known that I, RAYMOND N. EHRHART, a citizen of the United States, and a resident of Edgewood Park, in the county of Allegheny and State of Pennsylvania, have made a new and useful Invention in Fluid-Brakes, of which the following is a specification.

This invention relates to a fluid brake to be used in determining the developed horsepower or torque of a motor or shaft.

One of the objects of the invention is to provide a hydraulic absorption dynamometer which may be utilized in connection with a relatively low speed motor or shaft to determine its energy.

Another object of the invention is to provide means for using the liquid repeatedly and for maintaining an approximately constant amount of liquid within the casing.

With the above and other objects in view the invention consists in certain parts and combinations of parts all of which will be described hereinafter, it being understood that changes in form, proportions and minor details or construction may be resorted to without departing from the spirit of the invention or sacrificing any of the advantages thereof.

In the drawings Figure 1 illustrates a longitudinal sectional view through a dynamometer constructed in accordance with my invention. Fig. 2 is an end view of the same showing the scale in position and part of the end of the casing broken away to illustrate certain interior features of construction, and Fig. 3 is a diagrammatical view of a portion of the rotor showing the blades thereon together with the relative position of the blades or vanes which are attached to the casing or stator.

The invention is illustrated as comprising two main elements, the stator and the rotor. The stator is provided with inlet ports which project water into the stator or casing and through openings in the drum of the rotor so that the liquid may resist the movement of certain blades on the rotor and thus resist the movement of the rotor. The liquid introduced into the stator or casing may be caused to repass the blades until it is finally generated into steam or vapor and passed off through a suitable orifice or orifices. The stator is adapted to have a slight rotative movement on its bearing, so that the arm projecting therefrom may exert pressure or weight upon a suitable scale so that the resistance which the casing must offer to prevent its being rotated may be measured by the pressure exerted on the scale. From this pressure the effective length of the arm and the number of revolutions per minute, the power is calculated in identically the same manner as in the case of an ordinary Prony or band brake.

Referring now to the drawings by numerals of reference 10 and 11 designate pedestals for a shaft 12. The shaft 12 may be connected direct to a motor or it may be connected to a reducing gear or any other change speed gear. The present case illustrates the shaft 12 as carrying the rotor of the dynamometer or brake. The rotor is illustrated as consisting of a drum 13 having a hub 14, keyed or otherwise secured to the shaft 12. The hub is connected to the drum by a plurality of spaced webs 15 on the respective sides of the ports or passages 16 in the drum. At the respective ends of the drum are circumferentially arranged nozzles or reëntering ports 17, whereby the fluid may be caused to pass from the inlet ports of the stator to the interior of the drum and thence to the ports 16. The nozzles 17 are connected to rings 18 which are carried by the drum.

As heretofore explained, the nozzles 17 are adapted to register with the inlet ports 19 and 20 in the stator or casing 21. This stator or casing is mounted on pedestals 22 and 23 carried on the shaft 12 and the ends of the casing are provided with suitable packings 24 and 25.

Projecting from the exterior of the casing 21 is an arm 26, which through any suitable means may exert pressure against the scale 27.

The stator and rotor are provided with alternate rows of blades or vanes but for the sake of clearness those on the rotor will be designated blades and those on the stator will be designated vanes.

By reference to Fig. 1 it will be observed that the stator is provided with a row of relatively wide flat vanes 28 which when all the parts are in position, will be opposite the openings 16 in the rotor. On either side of this row of vanes 28 I have shown alternate rows of blades and vanes designated by the reference numerals 29 and 30. The blades are illustrated as being approximately the shape of an ordinary Parsons turbine blade but the vanes are illustrated as being relatively flat, the purpose of which will be more clearly brought out hereinafter. The respective ends of the stator are concave adjacent to the nozzles 17 and these concave ends are provided with spaced circumferentially arranged abutments or baffles 31 against which the liquid may be thrown by the rotor so as to have the energy therein dissipated or partially dissipated before entering the nozzle 17 to again pass through the openings 16. The stator is also provided with exhaust ports 32, one for each end of the stator or casing and these ports may be provided with suitable valves designated 33. The reference numerals 34 indicate steam passages leading to outlet orifices 35 in the stator and through which steam or heat generated by the rotor may pass out into atmosphere.

Assuming that all the parts are assembled and motion is imparted to shaft 12, liquid may be caused to enter through the ports 19 and 20 through the nozzles 17, thence through the openings 16 where it will be deflected through the spaces between the vanes 28 and directed toward opposite ends of the rotor by the blades thereon. The action of the blades on the water will have a tendency to impart a whirling motion thereto so as to cause the water to be thrown against the vanes 30 where the angular velocity will cut down and the energy dissipated. This will recur with each succeeding row of blades and vanes until the water finally passes into the concave portions of the stator where the angular velocity will be further cut down by the water coming into contact with the baffles 31. Such water as has not been dissipated into vapor or steam will pass back through the nozzle 17 and re-enter the rotor so as to again resist the action of the blades and vanes. In actual practice it has been found that considerable steam or vapor is generated due to heat within the casing 21 and this may pass off through the orifices 35. To compensate for the loss of liquid within the casing due to the generation of vapor additional liquid may be introduced through the ports 19 and 20 and indeed a continuous flow of liquid may be permitted to pass into the casing and any excess of liquid may pass out through the ports 32 which are governed by the valves 33. A dynamometer of a given capacity may be regulated for different speeds and loads by maintaining different quantities of water within the casing 21.

By reference to the drawings it will be observed that the brake illustrated is of the double flow type in that the water enters the ports 16 and flows in opposite directions toward the respective ends of the casing. By this construction I am enabled to neutralize the end thrust of the stator.

It will also be noted that the inlet ports and the outlet ports may be regulated by the valves therein, thus means is provided for regulating the supply and discharge as well as the evaporation of the circulating fluid, because if the outlet ports are entirely closed the amount of water evaporated during a given time will be in excess of the amount evaporated if the discharge ports are opened and a considerable quantity of liquid is caused to enter the inlet ports and pass out through the exhaust ports.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In a liquid brake, the combination of a rotor, a stator spaced therefrom and capable of a limited amount of rotary movement co-axially with relation thereto, alternate annular rows of energy imparting blades, and energy dissipating vanes located in the space between the rotor and the stator and mounted on the rotor and stator respectively for progressively moving liquid delivered to the first row of blades through the coöperating blades and vanes.

2. In a liquid brake, a rotor, a casing surrounding the rotor, capable of a limited rotary motion co-axially with relation thereto and having a liquid inlet port formed therein, a series of annular rows of blades mounted on the rotor for imparting motion to liquid entering said port and for progressively moving the liquid from one end of the series to the other, and annular rows of energy dissipating vanes mounted on the casing and alternately arranged with relation to said rows of blades.

3. In a liquid brake, a rotor, a casing surrounding the rotor, having a limited rotary motion with relation thereto, and forming a space between it and the rotor with which an inlet port formed in the casing communicates, a series of alternate annular rows of energy imparting blades and energy dissipating vanes located in said space and mounted on the rotor and casing respectively for progressively moving liquid entering said port from one end to the other of said series of blades and vanes and a redirecting passage communicating with both ends of said space for delivering liquid discharged from one end back to the other end of the series of blades and vanes.

4. In a liquid brake, a stator having a limited amount of rotary motion around a fixed axis and provided with a liquid inlet port and a liquid delivery port, a rotor located within the casing, rotatable about an axis susbtantially coincident with the axis of rotation of said casing and provided with a liquid redirecting passage, a series of alternate annular rows radially extending blades and vanes located in an axially extending space between the rotor and casing with which both of said ports and said redirecting passage communicate.

5. In a liquid brake, a casing having limited rotary motion about a fixed axis and provided with a liquid inlet port, a liquid discharge port, and a vapor delivery port, a rotor located within the casing so as to provide an annular space between it and the casing which communicates with said inlet and said discharge ports, a series of alternate annular rows of liquid impelling blades and energy dissipating vanes located in said space and mounted on the rotor and stator respectively, and a liquid redirecting passage located in the rotor and communicating with both ends of said space for redelivering liquid discharged from the last row of said series of blades and vanes back to the first row.

6. In a water brake a rotor, the casing surrounding said rotor and having a liquid inlet port, a liquid discharge port and liquid redirecting passages located at the discharge end of the rotor, and a set of alternately arranged annular rows of blades and vanes mounted on the rotor and stator respectively, and through which a progressive movement of the liquid is occasioned by a rotation of the rotor.

7. In an apparatus of the character described a rotor element, a plurality of annular rows of blades mounted on the rotor, a pivotally mounted casing surrounding the rotor and provided with a liquid inlet port for delivering liquid to the blades and receiving passages for receiving the liquid discharged from the blades, and annular rows of vanes mounted on the casing and alternately arranged with the rows of blades.

8. In an apparatus of the character described a rotor, blades mounted thereon for receiving the liquid, a pivotally mounted casing surrounding the rotor and having a liquid inlet port for delivering liquid to said blades and receiving passages for receiving the liquid discharged from said blades and for redirecting and redelivering it to said blades, and vanes mounted on said casing for receiving the liquid delivered from the separate blades and for dissipating the kinetic energy of the liquid.

9. An apparatus of the character described comprising a cylindrical rotor, provided with an annular series of liquid delivery ports located between the ends thereof, radial blades mounted on the rotor element and adapted to receive liquid delivered through said series of ports, a pivotally mounted casing surrounding said rotor and provided with liquid delivery ports at each end thereof for delivering liquid to said annular series of ports and liquid passages formed at the ends of the casing for receiving liquid discharged from said blades and for redirecting it into said annular series of ports, and radially extending annular rows of energy dissipating vanes mounted on said casing and arranged alternately with said rows of blades.

10. In an apparatus of the character described a rotor, a pivotally mounted casing surrounding the rotor and provided with a liquid delivery port, liquid directing passages and a vapor outlet port, a series of alternately arranged annular rows of blades and vanes mounted on the rotor and casing, respectively, for receiving liquid from the liquid delivery ports, for propelling the liquid through the series of blades and vanes and for discharging it into the redirecting passages.

In testimony whereof, I have hereunto subscribed my name this 21st day of October, 1909.

RAYMOND N. EHRHART.

Witnesses:
  C. W. McGhee,
  B. F. Funk.